United States Patent [19]
Wilson

[11] Patent Number: 5,543,198
[45] Date of Patent: Aug. 6, 1996

[54] NOISE ATTENUATION PANEL

[75] Inventor: Robert S. Wilson, Belfast, Northern Ireland

[73] Assignee: Short Brothers PLC, Belfast, United Kingdom

[21] Appl. No.: 498,845

[22] PCT Filed: Jul. 24, 1989

[86] PCT No.: PCT/GB89/00841

§ 371 Date: May 21, 1990

§ 102(e) Date: May 21, 1990

[87] PCT Pub. No.: WO90/00968

PCT Pub. Date: Feb. 8, 1990

[30] Foreign Application Priority Data

Jul. 25, 1988 [GB] United Kingdom ............ 88/17669

[51] Int. Cl.$^6$ ....................................... B32B 3/12
[52] U.S. Cl. .................. 428/116; 52/793.1; 181/292; 428/118; 493/966
[58] Field of Search ...................... 428/116, 118; 52/793.1; 181/292; 493/966

[56] References Cited

U.S. PATENT DOCUMENTS

| | | | |
|---|---|---|---|
| 3,673,057 | 6/1972 | Fairbanks | 428/116 |
| 3,819,007 | 6/1974 | Wirt et al. | 428/116 X |
| 3,831,710 | 8/1974 | Wirt | 428/116 X |
| 3,977,492 | 8/1976 | Hankel | 181/292 |
| 4,111,081 | 9/1978 | Hilliard et al. | 428/116 X |
| 4,318,453 | 3/1982 | Rose et al. | 428/118 X |
| 4,384,020 | 5/1983 | Beggs | 428/116 X |
| 4,465,725 | 8/1984 | Riel | 428/116 |
| 4,933,131 | 6/1990 | Okey et al. | 428/116 X |
| 4,957,577 | 9/1990 | Huebner | 428/116 X |

FOREIGN PATENT DOCUMENTS

| | | |
|---|---|---|
| 750239 | 6/1956 | United Kingdom . |
| 899685 | 6/1962 | United Kingdom . |
| 238410 | 7/1980 | United Kingdom . |
| 2122540 | 1/1984 | United Kingdom . |

Primary Examiner—Henry F. Epstein
Attorney, Agent, or Firm—Fish & Richardson P.C.

[57] ABSTRACT

A noise attenuation panel having a backing sheet, a facing sheet and a cellular core having a multiplicity of open-ended juxtaposed cells. The backing sheet extends across the ends of the cells at the rear of the core and the facing sheet extends across the ends of the cells at the front of the core. The facing sheet is made of a porous permeable thermoplastics material. The porous permeable thermoplastics material for the facing sheet is produced by powder sintering a thermoplastics material.

15 Claims, 2 Drawing Sheets

NOISE ATTENUATION PANEL

This application is a continuation of PCT/GB89/00841, filed Jul. 24, 1989, designating the United States.

The present invention relates to noise attenuation panels and is particularly, although not exclusively, concerned with noise attenuation panels for use in the attenuation of noise in aero engines.

It has previously been proposed to provide noise attenuation panels for reducing turbine engine noise, the panels being formed as integral parts of the aero engine structure. For example, the panels may form part of a cowling surrounding a turbine engine inlet duct or be placed adjacent a high turbulence region of the fan of a turbo fan engine.

In particular, prior specification GB 2056367A describes a process for producing broad band noise attenuation panels for use in such environments, where they are used as skin surfaces adjacent the engine.

The panel of GB 2056367A comprises a central honeycomb core having a plurality of open-ended juxtaposed cells, an imperforate backing sheet extending across the ends of the cells at the rear thereof, a perforate inner facing sheet extending across the ends of the cells at the front of the core and an outer facing sheet of fibrous or woven material bonded to the inner facing sheet, which is said to improve the sound attenuation characteristics.

The preferred material for the core and the backing and inner facing sheets of the panel of GB 2056367A is aluminium due to its weight versus strength and cost characteristics, although it is envisaged that other metals or materials could be used where these requirements are not considered.

The inner facing sheet for the panel of GB 2056367A is perforated with a plurality of small perforations and the outer facing sheet is adhesively bonded to the surface of the perforated inner facing sheet. The preferred material for the woven outer sheet is stainless steel, which is woven as a Dutch twill fabric, although it is stated that other types of material and weave pattern may be utilised.

It has furthermore previously been proposed in patent specification GB 2122540A to provide a noise attenuation panel of the form described in GB 2056367A, except insofar that the apertured inner facing sheet is formed from a carbon fibre/resin matrix composite material. In particular, the apertured inner facing sheet is formed as an open weave material in which the apertures are constituted by hexagonal openings between three sets of carbon threads mutually arranged at 60° to one another. The porous woven outer facing sheet is, however, made of stainless steel.

The use of a composite material for the apertured inner facing sheet of the panel disclosed in GB 2122540A has, it is stated, advantages over the use of materials such as aluminium. The apertures can for example be formed while the resin matrix of the composite is in a partially cured condition, leading to a far less expensive process than forming perforations in a metal sheet. Furthermore, the resin matrix of the composite material could, it is stated, itself provide an adhesive medium by which the porous outer facing sheet is secured to the apertured inner facing sheet.

While the noise attenuation panel disclosed in GB 2122540A has been found to be successful for use in aero engine environments, it suffers from a number of disadvantages. In particular, it has been found that the use of a woven material for the porous outer facing sheet gives rise to a relatively high resistance to high speed air flow over the surface and that sound attenuation is effective over a relatively narrow band of frequencies. Furthermore, the problem of metal galvanic corrosion is resent where the material used is stainless steel.

It is an object of the present invention to provide a noise attenuation panel which does not suffer from the above-mentioned disadvantages of the noise attenuation panels previously proposed and as hereinbefore set forth or does not suffer to the same extent from those disadvantages.

According to a first aspect of the present invention there is provided a noise attenuation panel comprising a backing component part, a facing component part and a cellular component part having a multiplicity of open-ended juxtaposed cells, the backing component part extending across the ends of the cells of the cellular component part at the rear thereof and the facing component part extending across the ends of the cells of the cellular component part at the front thereof, characterised in that the facing component part comprises or includes an outer facing sheet which is made of a porous permeable thermoplastics material.

Preferably, the porous permeable thermoplastics material is produced by powder sintering of a thermoplastics material.

Examples of suitable thermoplastics materials include polyether ether ketone, polyaromatic ketone, polyphenylene sulphide, polyamide-imide, thermoplastic polyimide, polyether-imide, polyurethane and polyethylene.

In all embodiments of the invention hereinafter to be described, the backing component part is imperforate and made of an impermeable sheet material which may be made from a non-porous thermoplastics material. In some embodiments of the invention hereinafter to be described, the cellular component part is also made of an impermeable sheet material which may also be a non-porous thermoplastics material.

In a first embodiment of the invention hereinafter to he described, the facing component part further includes an inner support sheet which is perforated and which provides structural support from the outer facing sheet.

The perforated inner support sheet may take any one of a number of different forms and may be made from any one of a number of different materials. It may, for example, be formed from (i) a carbon/epoxy resin composite material as proposed in GB 2122540A, (ii) a perforated aluminium alloy sheet, or (iii) an open weave material produced from an epoxy resin impregnated carbon fibre. It may also be made from a thermoplastics material.

In a second embodiment of the invention hereinafter to be described, the cellular component part comprises a front cellular element having a multiplicity of open-ended juxtaposed cells, a rear cellular element having a further multiplicity of open-ended juxtaposed cells and a septum element which extends across the ends the cells of the rear cellular element at the front thereof and the ends of the cells of the front cellular element at the rear thereof and which is made of a porous permeable thermoplastics sheet material.

The porous permeable thermoplastic sheet material forming the septum element may be produced by powder sintering of a thermoplastics material.

The walls of the cells of the rear cellular element are preferably made of a non-porous impermeable sheet material whereas the cells of the front cellular element may in accordance with a further embodiment of the invention be made of a porous permeable thermoplastics material.

According to a second aspect of the present invention, there is provided an aero engine including as a structural part of the engine a noise attenuation panel according to the first aspect of the invention.

BRIEF DESCRIPTION OF THE DRAWINGS

Embodiments of the invention will now be described with reference to the accompanying drawings in which.

Figure 1:
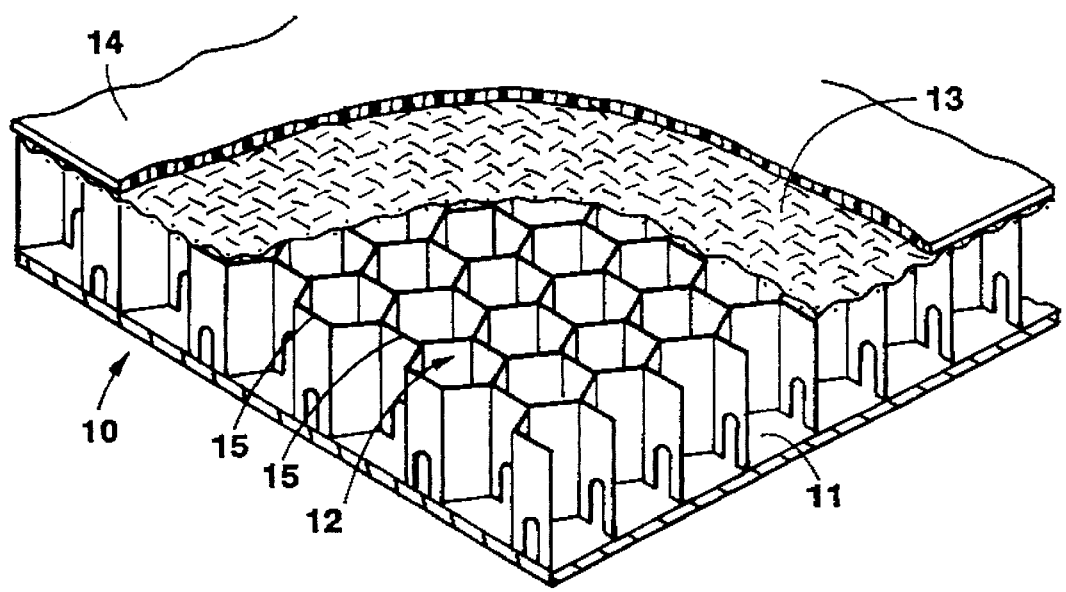
FIG. 1 is a schematic perspective view from above of a noise attenuation panel according to a first embodiment of the invention.
Figure 2:
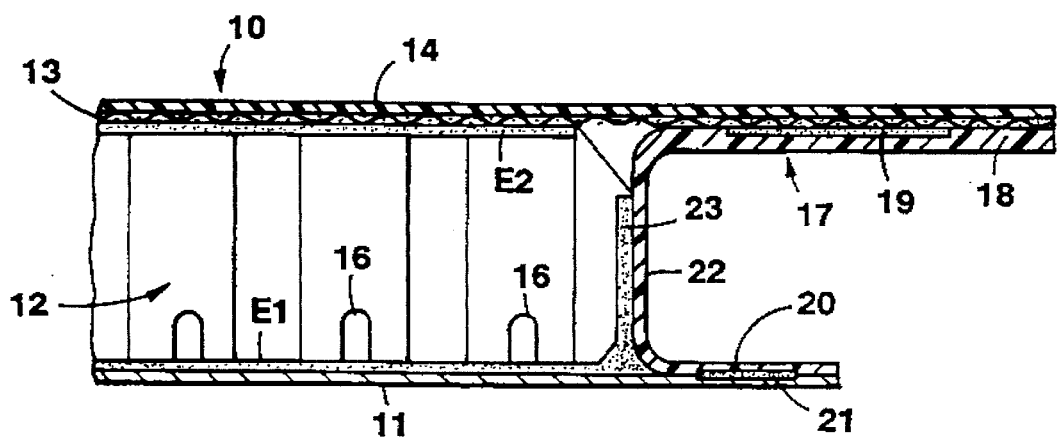
FIG. 2 is a schematic cross section of an end region of the panel shown in FIG. 1, secured to a supporting channel member.

Referring first to FIGS. 1 and 2, the noise attenuation panel 10 comprises a backing sheet 11, a cellular core 12 and inner and outer facing sheets 13 and 14.

The cellular core 12 comprises a multiplicity of open-ended juxtaposed cells 15 of hexagonal cross section to provide a honeycomb configuration.

The backing sheet 11 is unperforated and made from an impermeable sheet material, as shown in FIG. 2, and is secured by an epoxy resin adhesive E1 to the lower face of the cellular core 12.

The inner facing sheet 13 is made from an open square weave fabric formed from a carbon fibre/resin matrix composite material and the weave is such as to provide apertures constituted by the openings between adjacent warp and weft threads of the fabric. The fabric is preferably so woven as to produce a proportion of open aperture area relative to the total surface area of the sheet of around 30%. At the same time, the fabric is so woven that a relatively large number of its apertures are contained within the bounds of each cell 15 of the cellular core 12.

The outer facing sheet 14 comprises a sheet of a porous permeable thermoplastics material produced by powder sintering the thermoplastic. Examples of suitable thermoplastics materials include polyether ether ketone, polyaromatic ketone, polyphenylene sulphide, polyamide-imide, thermoplastic polyimide, polyether-imide, polyurethane and polyethylene.

The outer facing sheet 14 is bonded to the inner facing sheet 13 and the inner facing sheet 13 is, as shown in FIG. 2, secured to the upper face of the cellular core 12 by means of an epoxy resin adhesive E2.

As best seen in FIG. 2, the cells 15 are provided with drainage slots 16 to allow for condensates to drain from the panel 10.

During manufacture of the panel 10, it may be found advantageous to form the inner woven facing sheet 13 in a partially cured condition and to bring the outer facing sheet 14 into contact with it during a final curing step so that the resin serves to bond the two sheets together. The combined sheets 13 and 14 may then be secured to the upper face of the cellular core 12 using the epoxy resin adhesive E2.

The epoxy adhesives E1 and E2 may for example be obtained from Ciba-Geigy Plastics & Additives Company Limited of Cambridge, England. Adhesives and resins need not however be epoxy resin adhesives, but could for example be a phenolic, polyimide or thermoplastics resin.

The backing sheet 11 requires to be imperforate and made of a non-porous impermeable material and may be made of any of the following materials:

(i) A carbon/thermoplastic composite where for example the thermoplastic is polyether ether ketone, the material being automatically tape wound or hand laid.

(ii) A carbon/epoxy resin.

(iii) An aluminum alloy.

The cellular core 12 is preferably made from a non-porous impermeable sheet of any of the following materials:

(i) A thermoplastic such as polyether ether ketone.

(ii) A polyester fabric/phenolic resin.

(iii) A fiberglass/phenolic resin.

(iv) A NOMEX/phenolic resin (NOMEX being a registered trade mark for an aramid fibre paper impregnated with various resins to produce a structural material. By "aramid is meant an aromatic polyamide polymer).

(v) An aluminium alloy.

The panel 10 is of arcuate form, possibly of double curvature, and is embodied as a structural part of a duct of a nose cowl of a turbofan aero engine, the panel 10 being one of several arcuate panels disposed just upstream of the fan of the engine. It is, of course, of vital importance that the panel does not deteriorate in use and, in particular, that no part of it becomes detached from its supporting structure. The structure will usually include supporting channel members of which only one member 17 is shown in FIG. 2. The panel 10 is secured to the member 17 by bonding the inner facing sheet 13 to an outer face of a flange 18 of the channel member 17 using a carbon to carbon bond 19 and by bonding the backing sheet 11 to the outer face of a flange 20 of the channel member 17 using a carbon to carbon bond 21. The gap between the panel 10 and the base 22 of the channel member 17 may be sealed or closed by use of a mastic 23.

A panel having an outer facing sheet made of a porous thermoplastics material as described with reference to FIGS. 1 and 2 has been found to give rise to several advantages over the panels of the prior proposals, including the following:

(1) there is a lower flow resistance to high speed air flow, and therefore the overall power plant efficiency is improved over that obtained using the previously proposed panels;

(2) the sound attenuation is greater and covers a wider frequency range than that of the previously proposed panels;

(3) the thermoplastic component parts do not have the problem of metal galvanic corrosion;

(4) the panel is lighter than the previously proposed panels;

(5) there is an improved "blade-off" energy absorption compared with the previously proposed structures; and (6) there is an improved appearance.

Figure 3:
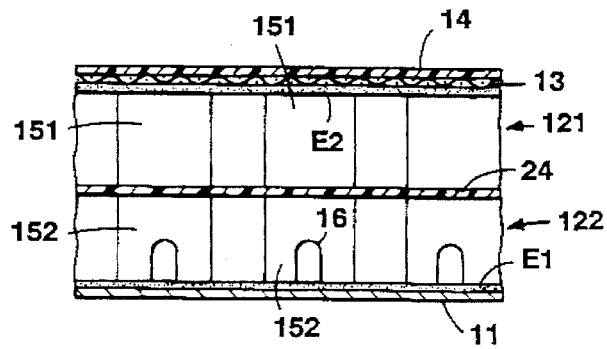
FIGS. 3, 4 and 5 are schematic scrap view cross sections of noise attenuation panels according to three further embodiments of the invention.

Referring now to FIG. 3, a panel according to a second embodiment of the invention is illustrated, in which the cellular core 12 of the embodiment of the invention described with reference to FIGS. 1 and 2 is replaced by a split cellular core comprising an upper cellular element 121 having a multiplicity of open-ended juxtaposed cells 151, a lower cellular element 122 having a further multiplicity of open-ended juxtaposed cells 152 and a septum sheet 24 which extends across the ends of the cells 152 of the lower cellular element 122 at the upper face thereof and the ends of the cells 151 of the upper cellular element 121 at the lower face thereof. The cells of the two cellular elements 121 and 122 form identical arrays and are arranged in alignment with each other.

The backing sheet 11, the inner and outer facing sheets 13 and 14 and the upper and lower cellular elements 121 and 122 of the panel shown in FIG. 3 are constructed and bonded together in the same manner as the sheet 11, core 12 and facing sheets 13 and 14 of the embodiment described with reference to FIGS. 1 and 2, with the backing sheet 11 being secured to the lower face of the lower cellular element 122 and the inner and outer facing sheets 13 and 14 being secured to the upper face of the upper cellular element 121.

The septum sheet 24 is likewise bonded to adjacent faces of the cellular elements 121 and 122. It is constructed from a porous permeable thermoplastics material and may take the same form as that of the outer facing sheet 14 of the panel described with reference to FIGS. 1 and 2.

Figure 4:
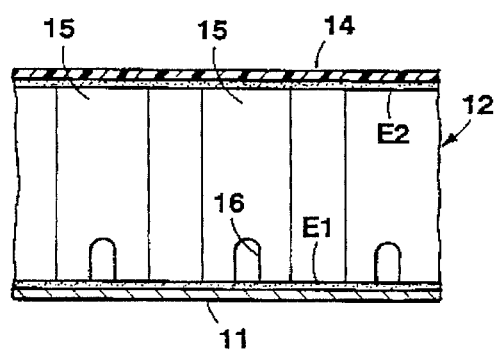

In a third embodiment of the invention illustrated in FIG. 4, the inner facing sheet 13 of the panel described with reference to FIGS. 1 and 2 is omitted and the outer facing sheet 14, which is made of the porous thermoplastics material, is adhered directly to the upper face of the cellular core 12 using adhesive E2.

Figure 5:
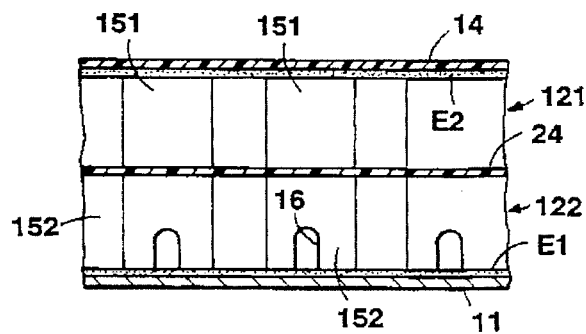

In FIG. 5, a fourth embodiment of the invention is illustrated which corresponds to the embodiment of the invention described with reference to FIG. 3, except insofar as the inner facing sheet 13 is omitted and the outer facing sheet 14 is adhered direct to the face of the upper cellular element 121 in the manner described for the panel illustrated in FIG. 4.

In yet another embodiment of the invention (not illustrated) the panel described with reference to FIG. 3 may be modified by making the upper cellular element 121 of a porous thermoplastics material and may be made from any of the materials proposed for the outer facing sheet 14 of the panel described with reference to FIGS. 1 and 2.

The septum sheet 24 in the panels illustrated in FIGS. 3 and 5 is described as being made of a porous thermoplastics material. It may however if desired be made of a stainless steel fabric or any of the above-mentioned materials which are suitable for the inner facing sheet 13, the requirement of course being that the sheet is either porous and permeable, perforated or apertured.

Figure 6:
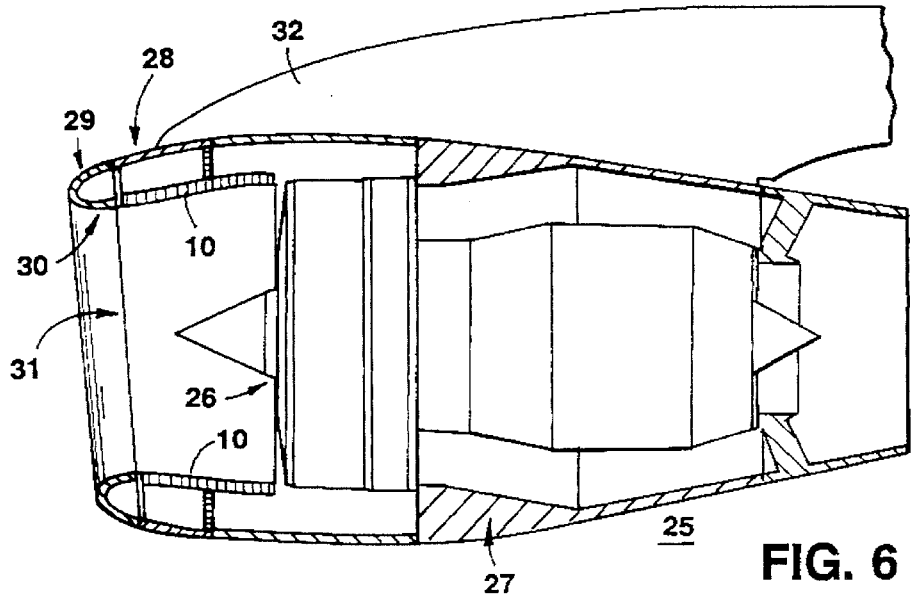
FIG. 6 is a schematic cross-section of an aero engine embodying noise attenuation panels according to the invention.

Referring now to FIG. 6, an aero engine 25 is schematically illustrated and includes a turbofan power unit 26 mounted within a nacelle 27 suspended from a pylon 32. The nacelle 27 includes a nose cowl 28 having an outer wall 29 and an inner wall 30. The inner wall 30 is in part formed by noise attenuation panels 10 as described and illustrated with reference to FIGS. 1 and 2. The panels 10 of FIG. 2 are arranged to form part of the inner wall of the nose cowl 28 in such disposition that the porous thermoplastics sheet 14 forms the wall surface defining the air intake duct 31 for the power unit 26. The panels 10, in this disposition, serve to reduce noise created by the high speed flow of air passing through the duct 31 and into the power unit 26, as well as to reduce noise generated by the fan blades of the unit 26.

It is to be emphasized that the panels 10 in FIG. 6 are not employed to reduce air noise by a reduction of the air speed by passage of the air through the panels, but by contrast acoustic attenuation is achieved without affecting the speed of the air which generates the noise, that is to say, the air does not pass through the noise attenuation panels 10.

In the aero engine mounting arrangement illustrated in FIG. 6, the power unit is carried by the wing mounted pylon 32. It will however be appreciated that noise attenuation panels 10 according to the present invention may equally well be employed for reducing noise in other aero engine installations.

I claim:

1. A noise attenuation panel comprising a backing component part, a facing component part and a cellular component part having a multiplicity of open-ended juxtaposed cells, the backing component part extending across the ends of the cells of the cellular component part at the rear thereof and the facing component part extending across the ends of the cells of the cellular component part at the front thereof, wherein the facing component part comprises an outer facing sheet of a porous permeable powder sintered thermoplastics material.

2. A panel according to claim 1, wherein the facing component part includes an inner facing sheet which is perforated.

3. A panel according to claim 2, wherein the inner facing sheet is made of an impermeable material.

4. A panel according to claim 1, wherein the backing component part is imperforate and made of an impermeable material.

5. A panel according to any one of claims 1, 2, 3 or 4, wherein the cellular component part comprises a front cellular element having a multiplicity of open-ended juxtaposed cells, a rear cellular element having a further multiplicity of open-ended juxtaposed cells and a septum element which extends across the ends the cells of the rear cellular element at the front thereof and the ends of the cells of the front cellular element at the rear thereof and wherein the septum element is in the form of a sheet of a porous permeable thermoplastics material.

6. A panel according to claim 5, wherein the porous permeable thermoplastics sheet forming the septum element is produced by powder sintering of a thermoplastics material.

7. A panel according to claim 5, wherein the walls of the cells of the rear cellular element are made of an impermeable material and wherein the cells of the front cellular element are made of a porous permeable thermoplastics material.

8. A panel according to claim 7, wherein the walls of the cells of the rear cellular element are made of a non-porous thermoplastics material.

9. A panel according to claim 1, wherein the walls of the cells of the cellular component part are made of an impermeable material.

10. A panel according to any one of claims 3, 4 or 9, wherein the impermeable material is a non-porous thermoplastics material.

11. A panel according to claim 1, wherein the thermoplastic material is polyether ether ketone.

12. A panel according to claim 1 wherein the thermoplastic material is selected from the group consisting of polyaromatic ketone, polyphenylene sulphide, polyamide-imide, thermoplastic polyimide, polyether-imide, polyurethane and polyethylene.

13. A noise attenuation panel comprising a backing component part, a facing component part and a cellular component part having a multiplicity of open-ended juxtaposed cells, the backing component part extending across the ends of the cells of the cellular component part at the rear thereof and the facing component part extending across the ends of the cells of the cellular component part at the front thereof, wherein the facing component part comprises an outer facing sheet of a porous permeable thermoplastics material produced by powder sintering said thermoplastic material.

14. A noise attenuation panel comprising a backing component part, a facing component part and a cellular component part having a multiplicity of open-ended juxtaposed cells, the backing component part extending across the ends of the cells of the cellular component part at the rear thereof and the facing component part extending across the ends of the cells of the cellular component part at the front thereof, wherein the facing component part comprises a porous permeable powder sintered thermoplastics outer facing sheet.

15. A noise attenuation panel comprising a backing component part, a facing component part and a cellular component part having a multiplicity of open-ended juxtaposed cells, the backing component part extending across the ends of the cells of the cellular component part at the rear thereof and the facing component part extending across the ends of the cells of the cellular component part at the front thereof, wherein the facing component part comprises a porous permeable outer facing sheet in the form of a body of powder sintered thermoplastics material, the degree of powder sintering being such as to make the outer facing sheet porous and permeable.

* * * * *

UNITED STATES PATENT AND TRADEMARK OFFICE
CERTIFICATE OF CORRECTION

PATENT NO.   : 5,543,198
DATED        : August 6, 1996
INVENTOR(S)  : Robert S. Wilson It is certified that error appears in the above-identified patent and that said Letters Patent is hereby corrected as shown below:

On the title page, item [56] U.S. Patent Document, the following should be inserted:

3,639,106 - 2/1972 - Yate - 428/116XR 4,111,585 - 9/1978 - Mascaro - 428/118XR 4,671,841 - 6/1987 - Stephens - 428/116XR Please make the following change under "FOREIGN PATENT DOCUMENTS":

"238410 - 7/1980 - United Kingdom" should be
  --2038410 - 7/1980 - United Kingdom--.

In Col. 2, line 1, "resent" should be --present--.

In Col. 2, line 32, "he" should be --be--.

Signed and Sealed this

Sixth Day of January, 1998

Attest:

BRUCE LEHMAN

*Attesting Officer*    *Commissioner of Patents and Trademarks*